PRIOR ART FIG. 1
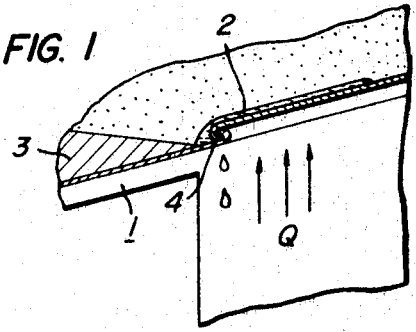
FIG. 2
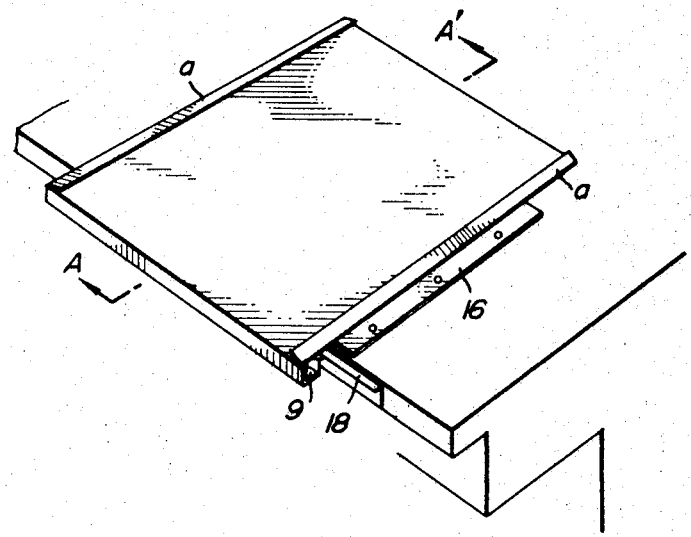
FIG. 3
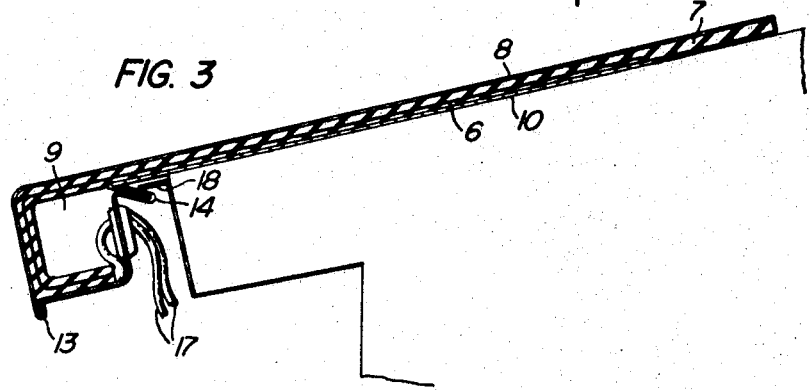

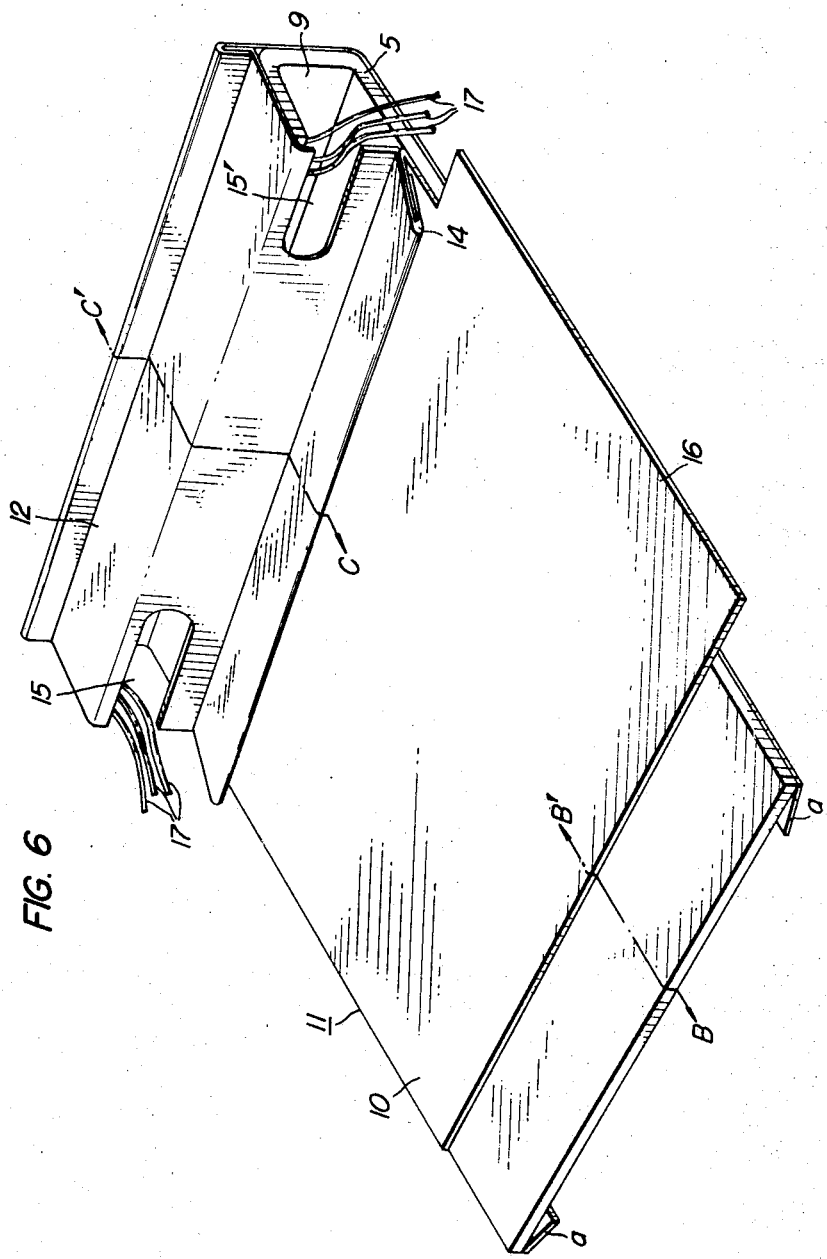

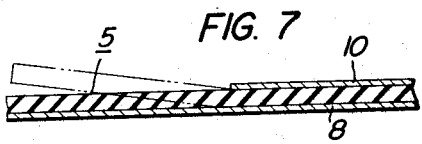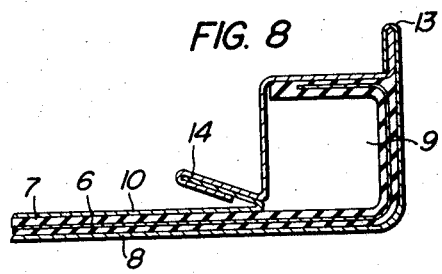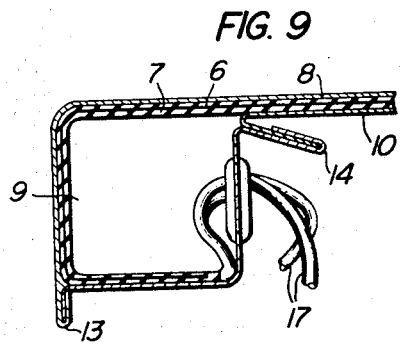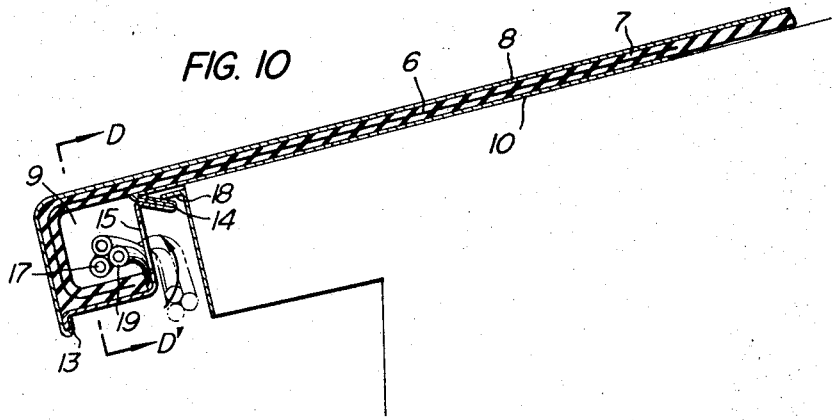

July 21, 1970

TADAO TOYOOKA ET AL 3,521,029

PLANAR HEATER FOR MELTING SNOW

Filed June 17, 1968

INVENTORS
TADAO TOYOOKA
HIROMUTSU UEDA, AKIRA KOBAYASH

BY

ATTORNEYS

INVENTORS
TADAO TOYOOKA,
HIROMUTSU UEDA,
AKIRO KOBAYASHI

United States Patent Office 3,521,029
Patented July 21, 1970

3,521,029
PLANAR HEATER FOR MELTING SNOW
Tadao Toyooka, Toyonaka-shi, Hiromutsu Ueda, Ibaragi-shi, and Akira Kobayashi, Toyonaka-shi, Japan, assignors to Matsushita Electric Industrial Co., Ltd., Osaka, Japan, a corporation of Japan
Filed June 17, 1968, Ser. No. 737,449
Claims priority, application Japan, June 19, 1967, 42/53,373; Dec. 21, 1967, 42/108,284
Int. Cl. H05b 3/10, 3/20
U.S. Cl. 219—201         5 Claims

ABSTRACT OF THE DISCLOSURE

A heater for melting and eliminating snow on a roof, which is to be attached at the eaves portion of the roof.

This invention relates to thawing systems for effectively eliminating snow on a roof by utilizing electric heaters. Snow on the roofs constitute one of the serious problems in snowy climates where people are forced to spend considerable amounts of money and labor for removing snow from the roofs of their houses to protect their houses from collapsing under the load of snow or from leaking thaw water.

In the conventional houses which are usually provided with insufficient thermal insulation in their top portions much heat is dissipated through the roof. As shown in FIG. 1 of the attached drawings, the melting of snow occurs most readily at portions of the roof 1 which are situated right above the heated rooms, that is, on the surface of the roof which is penetrated by the heat Q from the underlying room. The melted snow, that is, water 2 flows down along the surface of the roof 1. However, when the water reaches the eaves where the roof is very much cooled by cold air, it freezes again, and a block of ice is formed gradually. Such a block of ice is called an ice bank 3 and is most easily formed at a temperature of about $-4$ to $-7°$ C. The ice bank has usually a wedge-shaped transversal section and is formed in such a manner that the edge of the wedge climbs up the roof while the upper side of the wedge-shaped ice bank is kept nearly horizontal, until it attains a thickness of 20 to 30 cm. at the edge of the roof in the most general cases. In snowy climates, roofs are generally covered with iron sheets which are jointed together by fold joints 4 as shown in FIG. 1. If the ice bank grows so big that its edge reaches one of said fold joints, the water blocked by the ice bank will leak into the house through gaps in the joint. Such leakage has been a great nuisance to people in snowy countries, as it not only hampers their daily living but quickens decay of the timber.

Hitherto there have been some attempts to melt snow on a roof by laying a heating wire zigzag along the roof. With such a device, however, only snow adjacent to the heating wire will be melted if the snow is fairly abundant or if the weather is especially cold. As a result, not only the snow is not removed from the roof, but the possibility of the above-described leakage increases. Such problems have been solved by the present invention, according to which the heating wire is encased in a moulded insulating material which is resistive to high temperature as well as to low temperature and is formed into a flat planar unit and further, the thus fabricated heating unit is covered by metal plates for better distribution of the temperature.

Thus, one object of this invention is to provide a heater device of simple structure which can quickly melt the ice bank developed at the edge portion of a roof and at the same time, melt the snow on the upper area of the roof with enough effectiveness to bring the snow down gradually, thus achieving an effective removal of the snow.

Another object of this invention is to provide a heater device for melting snow which effects a different distribution of temperature between the eaves portion and the upper portion of the roof in order to quickly melt the ice bank developed on the eaves portion and to effectively and economically distribute the heating power, and which is easily adaptable to various types of roofs.

A further object of this invention is to provide a heater for melting snow which most effectively heats the eaves portion of the roof to ensure good drainage of drippings and thereby to prevent growth of icicles, and which is provided with a wiring duct to accommodate electric cables for safety and good appearance.

This invention will be described hereunder in connection with several embodiments thereof referring to the attached drawings, in which:

FIG. 1 is a schematic drawing of snow covering a roof which is not equipped with a heater for melting snow;

FIG. 2 is an isometric view of the principal portion of a roof equipped with a heater which is an embodiment of this invention;

FIG. 3 is a sectional view of the heater on the roof taken along line A–A' in FIG. 2;

FIG. 6 is an isometric view of the underside of the above-shown heater;

FIG. 7 is a sectional view of a portion of the heater taken along line B–B' in FIG. 6;

FIG. 8 is another sectional view of the same heater taken along line C–C' in FIG. 6;

FIG. 9 is a sectional view of the wiring duct portion of the heater;

FIG. 10 is a sectional view of the heater showing electric cables contained in the wiring duct;

Figure 4:
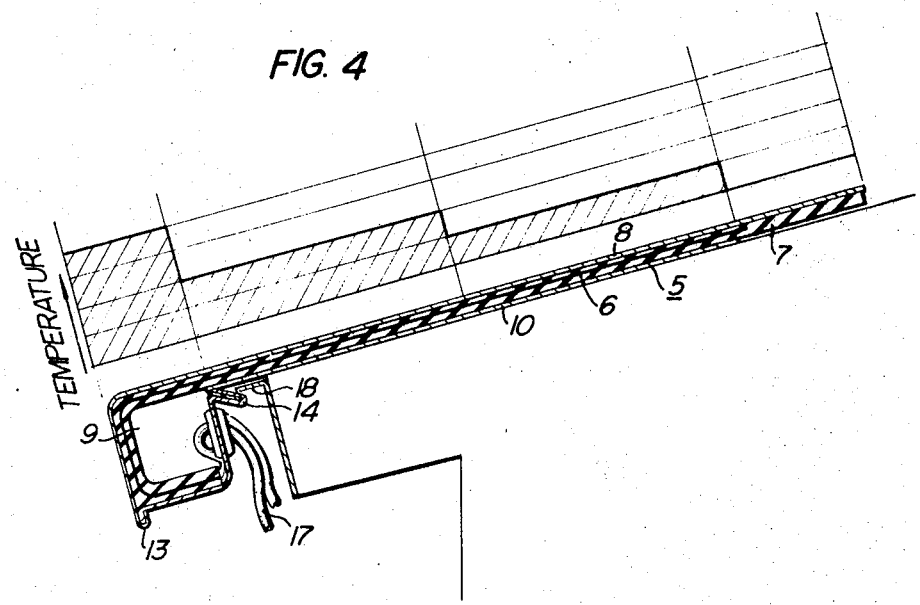
FIG. 4 is the same sectional view of the heater as in FIG. 3 shown with a diagram indicating the temperature distribution along the heater.
Figure 5:
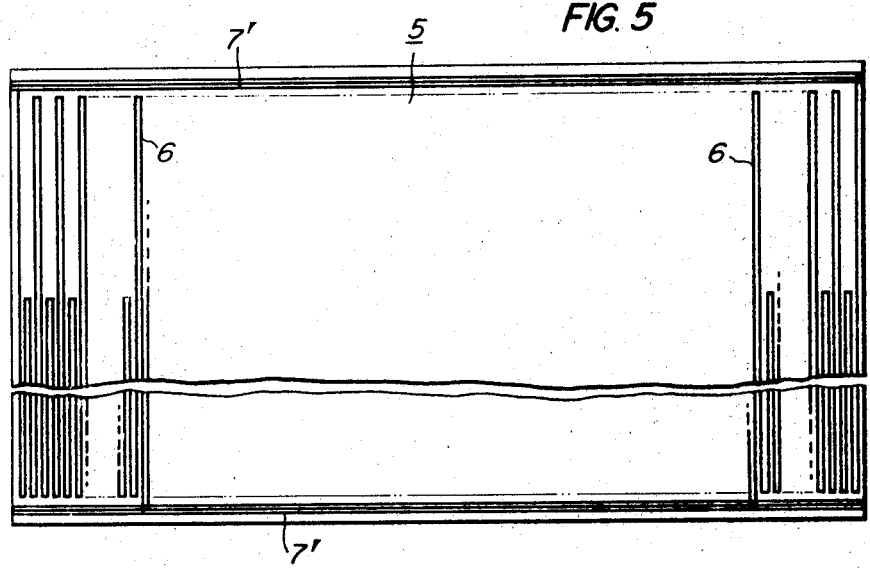
FIG. 5 is a schematic plan view of heating elements contained in the heater shown in the above figures.

Now, referring to FIGS. 2 to 14 which show an embodiment of this invention, planar heater 5 comprises a cloth-like structure woven of heat resistive dielectric fibers including cotton, synthetic fiber or glass fiber and a length of electric heating wire woven into said cloth-like structure along with wefts thereof in such a manner that the disposition of said juxtaposed heating wire forms a pattern the meander line of which lateral strokes have different extents in a predetermined regular order, thus the density of said heating wire is higher in an area defined by one edge of the cloth and a warp than in the remaining area. That is, the heating wire 6 is disposed in said planar heater 5 thinly in the upper half and densely in the lower half of said heater, as shown in FIG. 5. The assembly of the heating wire and said structure are then encased into heat-and-cold-resistive dielectric material 7 such as resin by moulding process. Either end of said heating element 6 is connected to main leads 7' disposed along the upper and lower edges of the heater respectively. On one surface of said planar heater 5 is attached a metal sheet 8 such as a galvanized iron sheet by means of an adhesive such as unsaturated polyester, said metal sheet 8 being extended in that end adjacent to the area of the heater where said heating wire is densely disposed and said extended portion of metal sheet being bent into rectangular C shape to form the wiring duct 9. Likewise, a metal sheet 10 is attached to the other surface of the planar heater 5, thereby constituting a sandwich-shaped main body 11 of the heating device. Lateral end portions of said metal sheet 8 are bent in U-shape respectively to form joint strips a. L-shaped cover 12 having bent end strips extending from either end of the L, is attached to the underside of said duct portion 9 in such manner that one of said end strips of said cover is fitted to the end portion of said metal sheet 8 which is shaped to constitute a hanging drip guide 13 at the front end of said main body 11, and that the other end strip of said cover 12 which is bent in U-shape, receives the end strip of metal sheet 10 thereby to constitute a hook strip 14 projecting from the neck of the duct portion 9. Thus, the duct 9 is completely enclosed by the use of the cover 12. As to openings 15 and 15' provide in the cover 12, explanation will be given later. The main body 11 of the heater is designed so that the metal sheet 10 is shorter than the metal sheet 8 in the end portion of the main body as shown in FIGS. 6 and 7 and that area of said planar heater devoid of metal sheet 10 does not contain heating wire nor is adhesively attached to the metal sheet 8, thereby permitting said area to be freely bent. Therefore, this portion of the heater can be bent or cut off as required when the heater is attached to a roof, thereby ensuring easy installation and neat finish. Attaching strip 16 which is a portion of the metal sheet 10 extended further than the end of the metal sheet 8 and the planar heater 5, is used to fix the main body 11 of the heater to the roof by driving nails through this part. Lead wires 17 which feed electric power to the heater are introduced in to the duct 9 through an opening in the cover 12.

Attachment of the above-described heating device to a roof is carried out by the following procedure. That is; fixing bar 18 is attached to the edge of the eaves, for example, with nails first, and the hook 14 projecting from the neck of the duct portion of the main body 11 of the heater is engaged to said fixing bar 18. Then, the main body 11 is secured to the roof by driving nails through the attaching strip 16 extending from the metal sheet 10. A plurality of such heating units are attached in a row according to the same procedure as described above, and then the joint strips a provided at the lateral ends of each heating unit are connected to similar joint strips a of the adjacent heating unit by fitting the sheath b to the joint strips a, being followed by caulking the joint thereby to ensure the connection of adjacent units as well as to prevent leakage of water through the joints.

Figure 11:
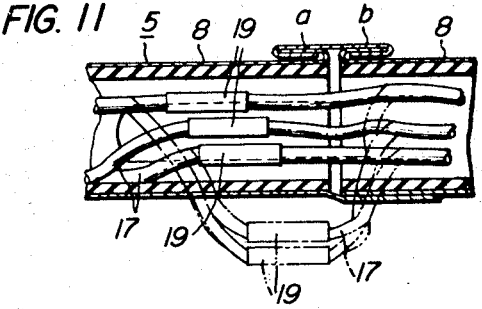
FIG. 11 is a sectional view of the duct portion taken along line D–D' in FIG. 10.

As shown in FIGS. 10 and 11, the lead wires 17 are connected to the similar lead wires 17 of the adjacent heating unit using water-resistive insulators and they are then pushed into the duct 9 through the cut portions 15 in the cover 12, thereby maintaining the neat appearance of the device and protecting the joints 19 of the wires from water and from harmful cold weather below freezing point with warm air inside the duct.

As previously described, the heating wire 6 is disposed in the planar heater 5, thinly in the upper half of the planar heater and densely in the lower half as shown in FIG. 5. And, the duct portion 9 is formed by bending the lower end portion of the planar heater. Accordingly, the temperature distribution along the surface of the main body includes three distinct levels as shown in FIG. 4, the temperature being higher at a point nearer to the edge of the roof where the cold air tends to create the ice bank.

Figure 12:
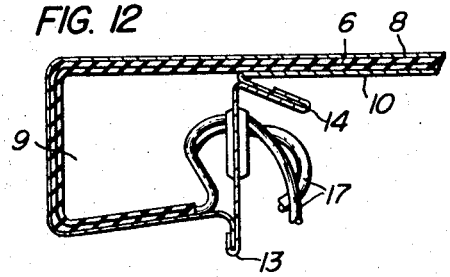
FIG. 12 is a sectional view of a modification of the duct portion of the same heater device.

Therefore, when the heater is turned on with substantial snow on the roof, snow adjacent to the heater is melted and runs down the surface of the heater, not freezing again at the duct portion which is positioned at the edge of the roof, and finally drops to the ground, being prevented from creeping into the underside of the duct portion by the drip guide 13 hanging from the front of the duct. If there is no drip guide provided, the water will creep into the underside of the duct and further to the edge of the roof which is sufficiently cooled to freeze the water again and to let grow icicles, thus accelerating decay of the hidden timber. Though the drip guide 13 may be provived at any position in the underiside of the duct, the nearer to the front edge of the duct it is positioned, the more effective it will be, as the temperature is higher at a position nearer to the front edge. Alternatively, a formation of the duct 9 which has a sloped bottom as shown in FIG. 12 will be effective for good drainage.

Figure 13:
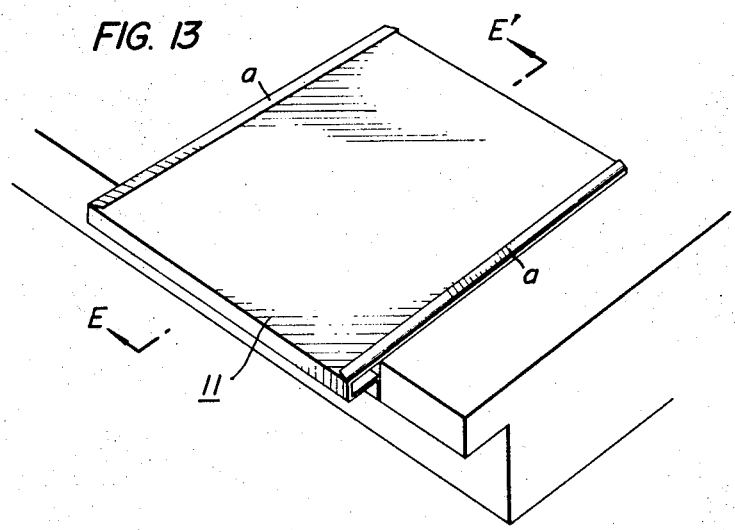
FIG. 13 is an isometric view of a modification of the same heater device shown as attached onto a roof.
Figure 14:
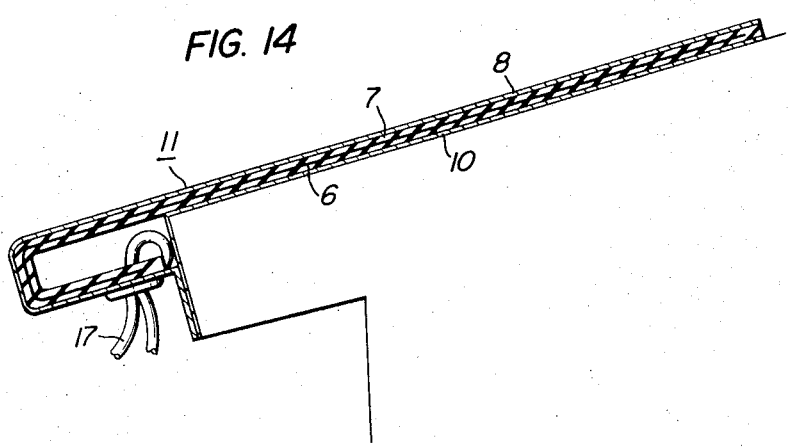
FIG. 14 is a sectional view of the heater shown in FIG. 13 taken along line E–E' in FIG. 13.

FIGS. 13 and 14 show a modified form of the above-described embodiment.

In short, the most important point in melting snow by a heater is the temperature at the edge of the roof. If it is not sufficiently high, the melted snow (water) will freeze there again to form an ice bank and possible cause leakage of the water, as described previously. This problem may be solved by the use of a heating wire of high power to raise the temperature. However, if the heating wire is evenly disposed in the heater, the use of the high-powered heating wire will heat the upper portion of the roof more than necessary only to waste the power as well as the cost of the heater. Therefore, as seen in the above-described embodiment, the heating wire is disposed with varying density in a planar heater, for example, the densty of wires disposed in the upper area of the heater being one half of that in the lower area. Moreover, as the lowest portion of the heater is bent so as to form the wiring duct, heat dissipation from the duct portion is about 4 times as much as that from the corresponding area of the upper portion of the heater, as indicated in FIG. 4. Thus, the ice bank developed at the edge portion of the roof is quickly melted and the snow on the upper area is heated enough to be able to slide down the roof, ensuring effective and economical consumption of heating power.

Further, the duct portion serves not only for raising the temperature of the edge of the roof, but for facilitating the wiring of feeding cables and protecting the cables and further for presenting a neat appearance at the edge portion of the roof.

The metal sheets such as galvanized iron sheets enclosing the planar heater help the conduction of heat and protect the heater from being damaged by pointed obstacles such as nails which may happen to be on the roof, or by an impact from whatever origin. Another advantage of the metal-enclosed heater is safeguard against electric shock. A snow heater is often electrostatically charged as it constitutes a capacitor with the overlying snow, thus retaining the danger of electric shock. This danger can easily be prevented by grounding the metal sheet.

Figure 15:
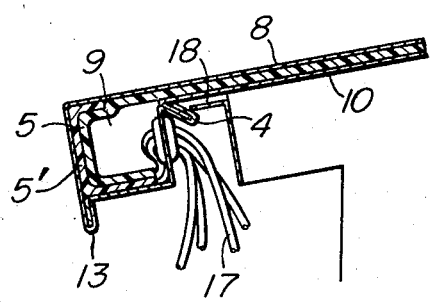
FIG. 15 is a sectional view of an embodiment of this invention which includes a main heater and an auxiliary heater.
Figure 16:
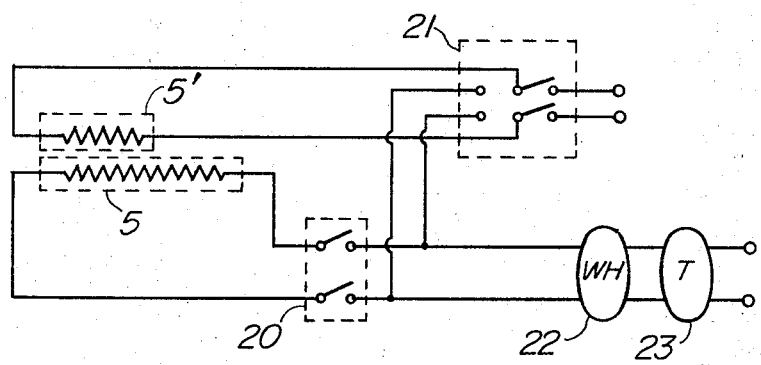
FIG. 16 is a connection diagram of the embodiment shown in FIG. 15.

If the device is constituted with a combination of a main heater 5 and an auxiliary heater 5 as shown in FIGS. 15 and 16, the former being powered during the night and the latter during the day, effective operation of the heater can be expected as the snow falls usually more abundantly during the night. If cheap off-peak power is available at night, the saving in the power cost will be remarkable. In FIG. 16, reference numeral 20 designates a switch for the main heater, 21 a change-over switch, 22 a watt-hour meter and 23 a timer-switch.

The auxiliary heater may be used only when the removal of snow during the night by the main heater is not sufficient. In snowy districts, it is not rare that a passer-by walking near a house is buried under snow which falls from the roof and is killed thereby. Such danger can be avoided by the use of the heater during the night, as the snow at the eaves can be effectively melted during the night when passers-by are rare.

From experiments on the required heating power, which was performed taking into consideration various natural conditions, it has been known that a power consumption of 650 to 800 w./m.² in the area between the edge of the roof and a line about 90 mm. up from the edge, is most effective for preventing development of the ice bank.

What is claimed is:

1. A planar heater for melting show to be set on a roof at the eaves portion, said heater comprising a heating element enclosed with a heat-and-cold resistive insulating material, said enclosed heating element being sandwiched, in an adherent manner, between a top metal sheet and a bottom metal sheet, a duct formed along the lower edge of the main plane of the heater and in the underside of the main plane by bending the lower end portion of the top metal sheet along with the corresponding portion of said insulated heating element, a closure member jointing the end of said top metal sheet and the end of said bottom metal sheet and which makes up the bottom and the backside of said duct, a drip guide extending along said duct at the joint of said top metal sheet and said closure member, and said heating element being disposed in such a manner that power dissipation from an area near to the end portion where said duct is formed is more than that from a corresponding extent of area in the other part of said heater.

2. A planar heater as defined in claim 1, wherein said heating element comprises a cloth-like structure woven from heat-resistive dielectric fibers and at least one electric heating wire woven into said cloth-like structure in the pattern of a meander line, and said heating wire is disposed so that the power dissipation rate in an area within 90 mm. from the edge of the eaves is 650–800 w./m.².

3. A planar heater as defined in claim 1, wherein said duct is formed to provide a wiring space and to allow easy access to the wiring therein.

4. A planar heater as defined in claim 2, wherein said heating element is divided into at least three zones of different heat dissipation rate.

5. A planar heater as defined in claim 1, wherein said heating element comprises a main heating element and an auxiliary heating element.

References Cited

UNITED STATES PATENTS

| | | | |
|---|---|---|---|
| 2,546,743 | 3/1951 | Harrison | 219—201 X |
| 2,699,484 | 1/1955 | Michaels | 219—213 |
| 2,938,992 | 5/1960 | Crump | 338—208 X |
| 3,129,316 | 4/1964 | Glass et al. | 219—345 |
| 3,283,128 | 11/1966 | Snyder | 219—553 X |

JOSEPH V. TRUHE, Primary Examiner

P. W. GOWDEY, Assistant Examiner

U.S. Cl. X.R.

219—213, 345, 553